Dec. 13, 1966  K. STEISSLINGER  3,291,017
CAMERA WITH A MOVABLY MOUNTED PHOTOELECTRIC MEMBER
Filed Nov. 22, 1963  2 Sheets-Sheet 2

KURT STEISSLINGER
INVENTOR.

BY R Frank Smith
Robert W Hampton

ATTORNEYS

United States Patent Office 3,291,017
Patented Dec. 13, 1966

3,291,017
CAMERA WITH A MOVABLY MOUNTED
PHOTOELECTRIC MEMBER
Kurt Steisslinger, Stuttgart-Hedelfingen, Germany, assignor to Eastman Kodak Company, Rochester, N.Y.
Filed Nov. 22, 1963, Ser. No. 325,569
Claims priority, application Germany, Jan. 5, 1963,
K 48,630
4 Claims. (Cl. 95—10)

The present invention relates to photographic cameras and particularly to a single-lens reflex camera in which a photoelectric member, such as a photocell, photo resistance or the like, for determining and/or controlling exposure is movably disposed in the ray path of the taking lens.

Cameras of this type are known in numerous embodiments. The photoelectric member, usually pivotally mounted, is commonly mechanically coupled to the camera actuating member in such a manner that upon operation of that member, or upon release of a lock for the actuating member, the photoelectric member is swung out of the ray path of the taking lens. The time at which the photoelectric member is removed from the taking-lens ray path, relative to shutter release, depends largely upon the manner of its removal. If the interval between the removal of the photoelectric member from the ray path of the taking lens and shutter release is too great, for example because of delayed or slow shutter release, errors in exposure may occur due to a change in scene lighting conditions in the meantime.

It is an object of the invention to eliminate this deficiency. In a photograhpic camera, particularly a single-lens reflex camera, in the taking-lens ray path of which a photoelectric member for determination and/or control of exposure values is movably arranged, the foregoing deficiency is eliminated, according to the invention, in that the removal of the photoelectric member from the taking-lens ray path is effected, directly or by interposing intermediate members, at a point of time between conclusion of the shutter release movement and before exposure, such removal being under control of the shutter while it is "running down," that is while its normal preset timing mechanism is operating, or under control of the reflex mirror or the cover flap while either of these is swinging into the non-operative (picture-taking) position. By means of the automatic control of the photoelectric member as a result of successive camera functions, the removal of the photoelectric member always occurs at exactly the same moment being the most favorable for exposure, regardless of the manner of handling by the operator.

Other objects of the invention will appear from the following description, reference being made to the accompanying drawings, wherein.

Figure 1:
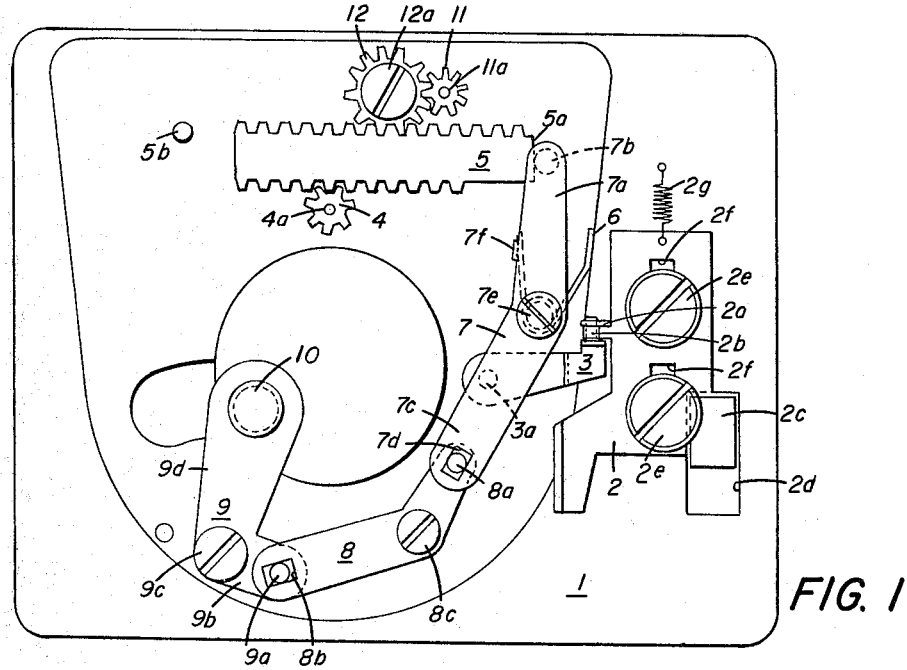
FIG. 1 is a rear view of the camera front plate with the photoelectric member in the taking-lens ray path and controlled by the shutter "run-down," or timing mechanism.
Figure 2:
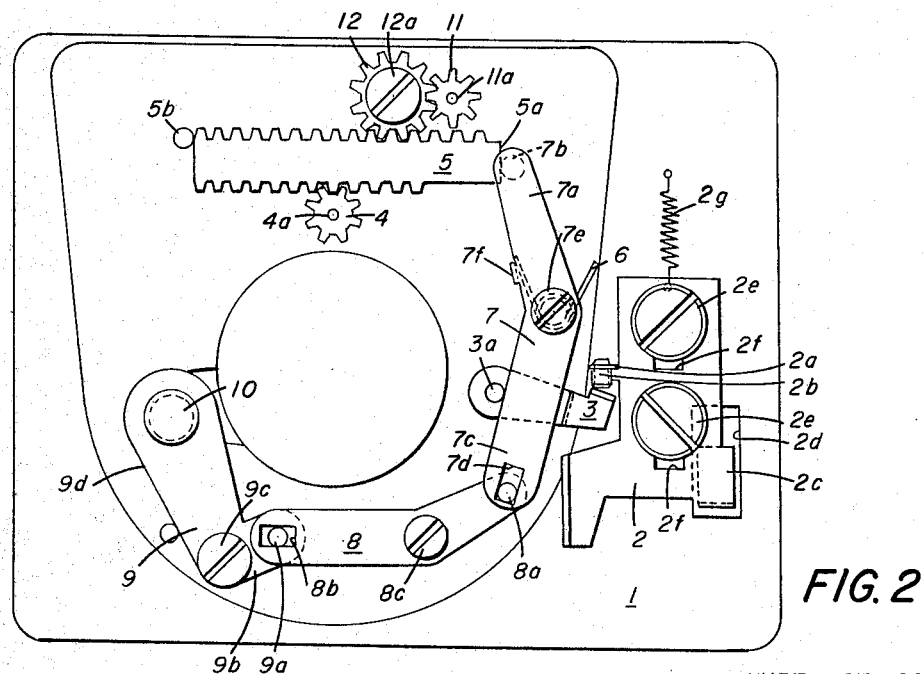
FIG. 2 is a view similar to FIG. 1 with the photoelectric member removed from the taking-lens ray path.

A camera actuating member 2 is mounted by bolts 2e, cooperating with slots 2f, for vertical sliding movement on a front plate 1 of a photographic camera, as shown in FIGS. 1 and 2. A spring 2g normally maintains member 2 in its upward position as shown in FIG. 1. The actuating member has a lug 2a carrying an adjusting screw 2b, cooperating with a shutter release lever 3, which is pivotally mounted at 3a. A between-the-lens shutter, which may be of the type illustrated in U.S. Patents Nos. 2,916,978, 2,920,544, 2,925,023, 2,925,764 and 3,081,681, is released for its run down when lever 3 is pivoted clockwise as shown in FIG. 2. A gear 4, rotatably mounted at 4a and engaging a toothed rack 5, is connected to the run-down mechanism of the shutter. A pin 7b on an arm 7a of a lever 7, pivoted at 7e, is maintained in contact with an edge 5a of rack 5 under the influence of a spring 6, which engages an ear 7f on lever 7. A pin 8a on an intermediate lever 8, which is pivoted at 8c, engages in a slot 7d on an arm 7c of lever 7. A slot 8b in lever 8 is engaged by a pin 9a on an arm 9b of a supporting member 9 for the photoelectric member 10. Member 9 is pivoted at 9c. A pair of gears 11 and 12, rotatably mounted at 11a and 12a, respectively, are connected to the opening device for the shutter and/or diaphragm blades or to the film transport and shutter cocking device, in a well known manner, for example as illustrated in the aforementioned U.S. patents.

The mode of operation of the embodiment corresponding to FIGS. 1 and 2 is as follows:

Upon depressing the camera actuating member 2 to the position shown in FIG. 2, the shutter release lever 3 is pivoted clockwise and the shutter is thus actuated for its run down, during which gear 4 moves rack 5 to the left until it contacts stop 5b which projects from plate 1. Under the influence of the spring 6 lever 7 moves counterclockwise, following rack 5. The supporting member 9 is pivoted counterclockwise by the intermediate lever 8 and the pin-slot connections 7d, 8a and 8b, 9a, and the photoelectric member 10 is thereby removed from the ray path of the taking lens. Accordingly, the position of the photoelectric member 10 is controlled by the shutter run down movement, which normally occurs just before exposure begins. When the camera actuating member 2 is released, thereby permitting it to be returned to its original position (FIG. 1) by spring 2g, the photoelectric member 10 is returned into the taking-lens ray path by movement of rack 5 under control of gears 11 and 12, either immediately after exposure or in response to the next film transport and shutter cocking.

Figure 3:
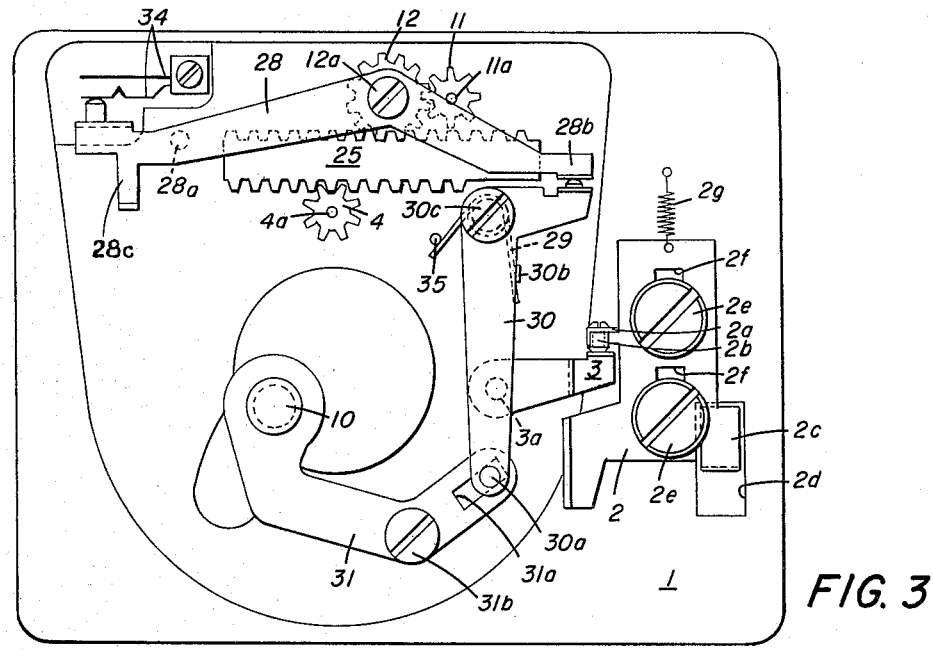
FIG. 3 is a rear view of the camera front plate with the photoelectric member in the taking-lens ray path and controlled by movement of the reflex mirror or cover flap.
Figure 4:
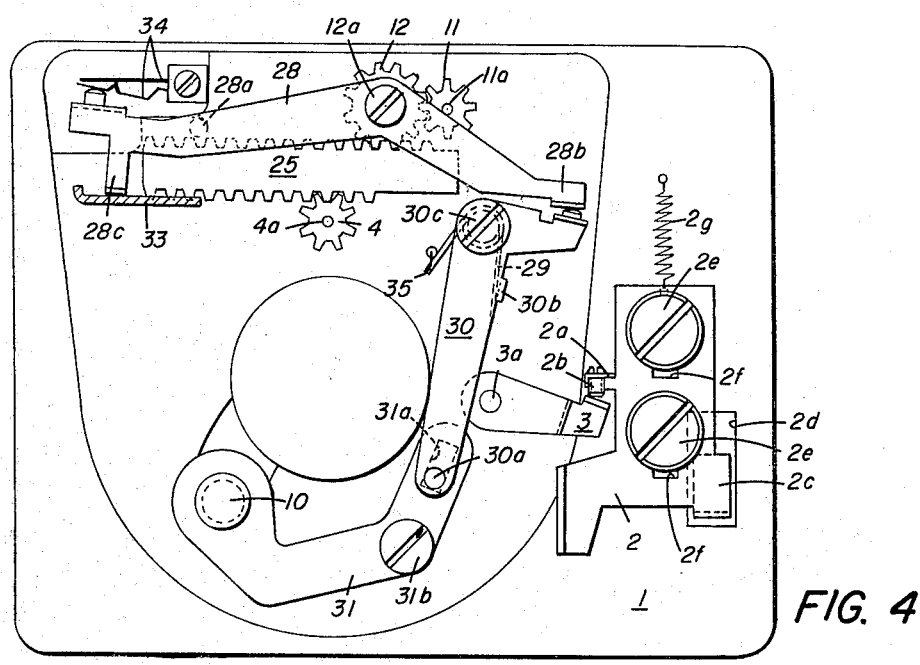
FIG. 4 is a view similar to FIG. 3 with the photoelectric member removed from the taking-lens ray path.

Another embodiment of the invention is disclosed in FIGS. 3 and 4 and differs from the one described above in the means for controlling the photoelectric member. A control lever 28 is pivotally mounted on the axis 12a of gear 12. Under the influence of a spring 29, a lever 30, which is pivoted at 30c, is maintained in contact with an arm 28b of control lever 28. A pin 30a on lever 30 engages a slot 31a of a supporting lever 31 for the photoelectric member 10. Lever 31 is pivoted at 31b.

The mode of operation is as follows:

Upon depressing the camera actuating member 2, the shutter release lever 3 is pivoted clockwise to release the shutter for its run down. By means of gear 4, the shutter causes rack 25 to move toward the left. After moving a predetermined distance, rack 25 contacts a pin 28a on control lever 28, thus stopping the shutter run down. During the above-described procedure, a control device, not shown, moves a cover flap 33 from the viewing position into the taking position (FIG. 4) in a well known manner. When the cover flap contacts an arm 28c of the control lever 28, that lever is pivoted clockwise, thereby performing the following three functions: (a) Closing a pair of flash contacts 34; (b) releasing rack 25 from engagement with pin 28a and permitting the rack to be moved further to the left by continued shutter run down; and (c) swinging the photoelectric member 10 out of the taking-lens ray path by means of levers 30 and 31.

Rack 25, continuing its leftward movement, trips the shutter in a well known manner. The return of the parts into their original positions (FIG. 3) is effected in the same manner as in the first embodiment.

The invention has been described in detail with particular reference to preferred embodiments thereof, but it will be understood that variations and modifications can be effected within the spirit and scope of the invention as described hereinabove and as defined in the appended claims.

I claim:

1. In a reflex camera having an objective lens, a cover flap movable from a viewing position to a taking position, a shutter, a manually operable camera actuating member, and a timing mechanism controlled by said actuating member to initiate exposure after a predetermined time of operation of said timing member, the combination comprising: a photocell; means normally supporting said photocell in the ray path of said lens, means for interrupting operation of said timing mechanism; and means controlled by said cover flap, upon movement thereof to its taking position for (1) disabling said interrupting means to permit said timing mechanism to resume operation, and (2) moving said support means to remove said photocell from said ray path a predetermined time prior to the beginning of exposure.

2. In a reflex camera having an objective lens, a cover flap movable from a viewing position to a taking position, a shutter, a manually operable camera actuating member, and a timing mechanism controlled by said actuating member to initiate exposure after a predetermined time of operation of said timing mechanism, the combination comprising: a photocell; means normally supporting said photocell in the ray path of said lens; a means movable from a first position to a second position in response to operation of said timing mechanism and operatively associated with said support means; means normally blocking movement of said movable means intermediate its said first position and its said second position to interrupt operation of said timing mechansm; control means responsve to movement of said cover flap to its taking position to withdraw said blocking means from the path of movement of said movable element thereby resuming operation of said timing mechanism; said support means being responsive to such resumption of operation to withdraw said photocell from the ray path of said lens prior to tripping of said shutter.

3. The combination according to claim 2 wherein said camera further includes a pair of flash contacts and wherein said control means closes said contacts upon movement of said cover flap to its taking position.

4. The combination according to claim 2 wherein said control member comprises a pivotal lever selectively engaged by said cover flap and wherein said blocking means comprises a pin mounted on said lever for selectively moving into the path of motion of said movable means.

References Cited by the Examiner
UNITED STATES PATENTS

| | | | |
|---|---|---|---|
| 2,976,789 | 3/1961 | Zimmer | 95—10 |
| 3,093,044 | 6/1963 | Lederer | 95—10 |
| 3,103,862 | 9/1963 | Kiper | 95—53.3 |

JOHN M. HORAN, *Primary Examiner.*